(12) United States Patent
Kim

(10) Patent No.: US 8,111,744 B2
(45) Date of Patent: Feb. 7, 2012

(54) METHOD AND APPARATUS FOR CONVERTING PHOTO SLIDES INTO MOTION PICTURES IN A MOBILE TERMINAL

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1349 days.

(21) Appl. No.: 11/370,518

(22) Filed: Mar. 7, 2006

(65) Prior Publication Data
US 2006/0198437 A1 Sep. 7, 2006

(30) Foreign Application Priority Data
Mar. 7, 2005 (KR) .................... 10-2005-0018821

(51) Int. Cl.
*H04B 1/66* (2006.01)
(52) U.S. Cl. ................ 375/240.01; 375/240.02
(58) Field of Classification Search .......... 375/240.01, 375/240.02
See application file for complete search history.

(56) References Cited

U.S. PATENT DOCUMENTS

| | | | |
|---|---|---|---|
| 6,268,864 B1 * | 7/2001 | Chen et al. ............. | 345/428 |
| 2003/0112820 A1 * | 6/2003 | Beach ..................... | 370/465 |
| 2004/0001599 A1 * | 1/2004 | Etter et al. ............ | 381/94.1 |
| 2004/0201871 A1 * | 10/2004 | Risheq ................... | 358/474 |
| 2005/0030369 A1 * | 2/2005 | Ryu ........................ | 348/14.01 |

FOREIGN PATENT DOCUMENTS

WO WO 2004110074 A2 * 12/2004

OTHER PUBLICATIONS

LG Electronics, VX8100 User Guide, publication date unknown, published by Verizon Wireless, USA.
LG Electronics, VX7000 User Guide, publication date unknown, published by Verizon Wireless, USA.

* cited by examiner

*Primary Examiner* — David C. Payne
*Assistant Examiner* — Brian J Stevens
(74) *Attorney, Agent, or Firm* — Lee, Hong, Degerman, Kang & Waimey

(57) ABSTRACT

A method and apparatus for converting a photo slide into a motion picture in a mobile terminal by which the photo slide including a plurality of photos is converted into the motion picture for MMS (Multimedia Message Service) message transmissions, thereby being able to be transmitted at a time, the method comprising: selecting a plurality of photos and storing the photos as a photo slide; establishing a transmission for the photo slide; automatically establishing an optimal combination of image quality and resolution according to the number of photos composing the photo slide; automatically converting the photo slide into a motion picture according to the optical combination; and transmitting the motion picture to a destination which a user selects.

23 Claims, 3 Drawing Sheets

METHOD AND APPARATUS FOR CONVERTING PHOTO SLIDES INTO MOTION PICTURES IN A MOBILE TERMINAL

CROSS REFERENCE TO RELATED APPLICATION

Pursuant to 35 U.S.C. §119(a), this application claims the benefit of earlier filing date and right of priority to Korean Application No. 10-2005-0018821, filed Mar. 7, 2005, the contents of which are hereby incorporated by reference herein in their entirety.

BACKGROUND OF THE INVENTION

1. Field of the Invention

The present invention relates to a mobile communications terminal, and particularly, to a method and apparatus for converting photo slides (still images) into motion pictures (video) in a mobile terminal.

2. Description of the Related Art

Mobile terminals having image capture devices (such as cameras) are becoming more popular, which has allowed users to easily take photos and videos anywhere and anytime. In addition, as wireless Internet access technologies continue to develop, users can download images, photos, and videos from a network server (or other storage means) by using their mobile terminals. Therefore, Multimedia Message Services (MMS) allow a user to send captured images or previously downloaded images together with brief messages attached thereto to other users.

When transmitting photos via MMS, there are relatively few problems when transmitting a small number of photos or when transmitting small-sized photos. However, if a large number of photos are to be attached and thus the maximum transmission capacity of an MMS message is exceeded or if the size of each photo to be transmitted is relatively large, transmitting such large sized or large number of photos via MMS cannot be properly achieved.

For instance, if the maximum transmission capacity of a typical MMS message is assumed to be around 400 Kbytes, and if the size of a single photo (having a resolution of 640*480 pixels of high image quality) is about 70 Kbytes, then up to five photos can be properly transmitted using a single MMS message. However, most wireless communication service providers limit the size of an MMS message that may be transmitted. For example, a maximum of only four photos may be allowed as an attachment to a single MMS message.

Therefore, if the user wishes to send more than the maximum number of photos allowed for attachment to a single MMS message, the user must inconveniently perform the procedures for sending an MMS message two or more times until the desired number of photos can all be transmitted. This also causes inconvenience to the recipient, who may need to receive several MMS messages and repeatedly perform the same message receiving procedures in order to obtain all the photos that were sent.

Also, because most wireless communication service providers charge their users per each MMS message being sent or received, the costs incurred in sending and receiving more than one MMS message undesirably increases the overall costs of communication.

In order to solve such problems caused by the limitations in sending and receiving MMS messages in the related art, a technique in which a plurality of photos are combined into a single photo slide-show and transmitted as an attachment file has been introduced. However, this technique still suffers from limited capacity, which does not meet the increasing demands of users who wish to send large numbers of high quality photos.

In addition, it is impossible to transmit the photo slide-show attachment to a recipient mobile terminal that does not properly support a photo slide-show function or to a recipient mobile terminal that has not been synchronized with the sender mobile terminal.

Moreover, because photos may have different formats according to the type or model of the mobile terminal, when transmitting photos to a recipient mobile terminal that is a different model than that of the sending mobile terminal, the format of photos to be transmitted must be converted into a suitable format that allows proper reception and processing at the recipient mobile terminal. As a result, the costs incurred and resources consumed for such format conversion are undesirably high.

SUMMARY OF THE INVENTION

One aspect of the invention is the recognition by the present inventors of the related art problems described above. Based upon such recognition, the present inventors conceived the present invention having the following features.

Certain features that may be part of the converting the photo slide into the motion picture method and terminal will not be described in much detail, merely to prevent the characteristics of the present invention from being obscured. However, such additional features may also be part of the method of converting the photo slide into the motion picture and the mobile terminal of the present invention, as would be understood by those skilled in the art.

The present invention relates to a mobile communications terminal, and particularly, to a method and apparatus for converting photo slide-show (still images) into motion pictures (video) in a mobile terminal. The photo slide-show may be composed of a plurality of photos that are converted into a motion picture which can be transmitted all at once as a single MMS (Multimedia Message Service) message.

Therefore, an object of the present invention is to provide a method for converting photo slides into a motion picture in a mobile terminal to thus allow transmission of multiple photos in a single MMS message.

Another feature of the present invention is to provide a method for converting a photo slide-show into a motion picture in a mobile terminal by which a photo slide-show is converted into a motion picture and then transmitted for a receiving terminal for which a photo slide-show function is not supported, and a is mobile communication terminal.

To achieve these and other advantages and in accordance with the purpose of the present invention, as embodied and broadly described herein, there is provided a mobile terminal for converting a photo slide into a motion picture, comprising: an output unit to display images; an input unit to generate a signal for capturing and transmitting image information displayed on the display unit; a processor to generate commands for capturing the image information displayed on the display unit according to the signal generated by the input unit; a memory to store the captured image as per the capturing command from the processor; a video conversion module to compress the stored image into motion picture data and store the compressed data as a motion picture file in the memory; and a transceiver to transmit and receive the captured image and the motion picture stored in the memory.

To achieve these and other advantages and in accordance with the present invention, as embodied and broadly described herein, there is provided a method for converting a photo slide-show into a motion picture in a mobile terminal, comprising: selecting a plurality of photos and storing them as a photo slide-show; establishing a transmission for the photo slide-show; automatically establishing an optimal combination of image quality and resolution according to the number of photos included in the photo slide-show; and automatically converting the photo slide-show into a motion picture according to the optimal combination.

Preferably, the optimal combination refers to adjusting image quality and resolution (size), considering the maximum transmittable capacity of the MMS. The image quality may be classified into highest image quality, high image quality, and normal image quality, and the resolution may be classified into 640*480 pixels, 320*240 pixels, 176*144 pixels, 128*96 pixels, or the like.

Preferably, the optimal combination is characterized in that image quality and resolution of the photo slide-show are pre-established according to the number of photos included in the photo slide-show, considering the maximum transmittable capacity of the MMS message.

Preferably, the conversion of the photo slide-show into the motion picture is carried out by using a method for capturing the photo slides displayed on a screen. The mobile terminal can show a user a motion picture to be captured for a stand-by (waiting) time taken by capturing the photo slides as a preview form.

Preferably, the conversion of the photo slide-show into the motion picture is characterized by adopting a no sound recording feature as a default value.

Preferably, the method for converting the photo slide-show into the motion picture in the mobile terminal further comprises a step of transmitting the converted motion picture to a destination which a user designates.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

In describing the present invention, if a detailed explanation for a related known function or structure is considered to unnecessarily digress from the gist of the present invention, such explanation will be omitted merely for the sake of brevity, but would be clearly understood by those skilled in the art.

Figure 1:
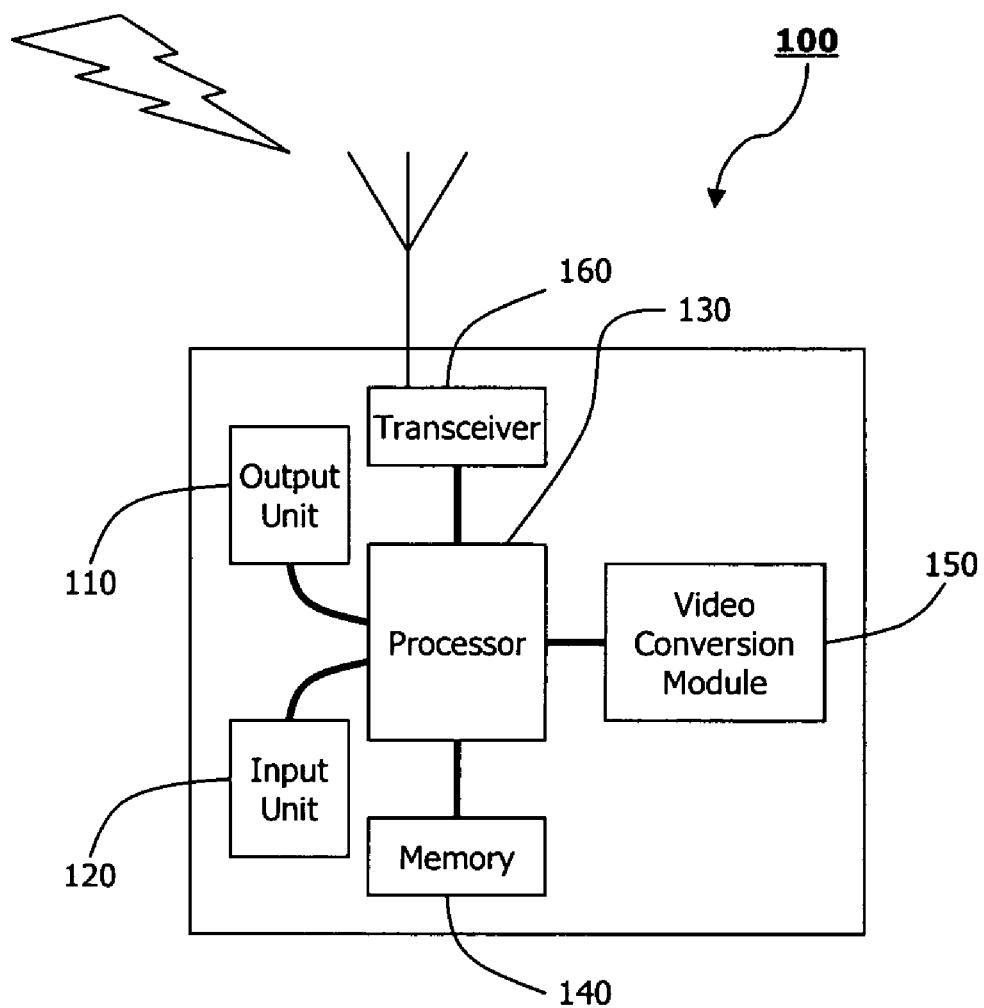
FIG. 1 shows an exemplary structure of a mobile terminal that may implement the features of the present invention.

FIG. 1 shows an exemplary structure of a mobile terminal that converts a photo slide into a motion picture. A mobile terminal 100 may be comprised of an output unit 110 (e.g., speaker, display unit, touch-screen, vibration unit, etc. to provide audible, visual, and/or tactile outputs) to output various information, such as image information; an input unit 120 (e.g., microphone, keypad, function buttons, touch-sensitive input device, etc. to allow audible, visual, and/or tactile inputs) to generate a signal for capturing and transmitting the image information displayed on the output unit 110; a processor 130 to generate commands for capturing the image information displayed on output unit 110 as per the signal from the input unit 120; a memory 140 to store the captured image information according to the capturing command from the processor 130; a video conversion module 150 to compress the stored image into motion picture data and store the compressed data as a motion picture file in the memory 140; and a transceiver 160 to transmit and receive the captured image and the motion picture stored in the memory 140.

Here, the processor 130 generates the commands to compute the optimal combination of image quality and resolution based on the maximum transmit capacity of Multimedia Message Service (MMS) message and numbers of still image or picture of a photo slide.

The video conversion module 150 executes a still image coding for designated specified screen frame to continuously store it in the memory 140 as compressed image file according to the command generated by the processor.

The processor 130 performs to display a message (notice, announcement), such as "processing motion picture files", after a preview is displayed on the output unit 110, to compress the image stored in the memory 140 into the motion picture data and to store it as the motion picture file in the memory 140. Concurrently, the processor 130 may delete pre-stored images (images that were already converted to the motion picture) in the memory 140. The processor 130 further cooperates with transceiver 160 to transmit the motion picture file as MMS message.

The terminal 100 may further comprise an input port to be engaged with an external input source (keyboard) in addition to the input unit 120 as cited earlier.

In addition, the terminal 100 may comprise an output port to be engaged with an external output unit, such as a television or monitor, to output image and audio signals.

Furthermore, the mobile terminal 100 may be configured to comprise a storage media receiving port that allows an external storage medium (such as a memory card) to be inserted thereto for storing data therein. Also, an additional (optional) function unit (such as a broadcast reception module, MP3 module, Internet banking module, etc.) may be provided.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile terminal 100 in accordance with the present invention.

Figure 2:
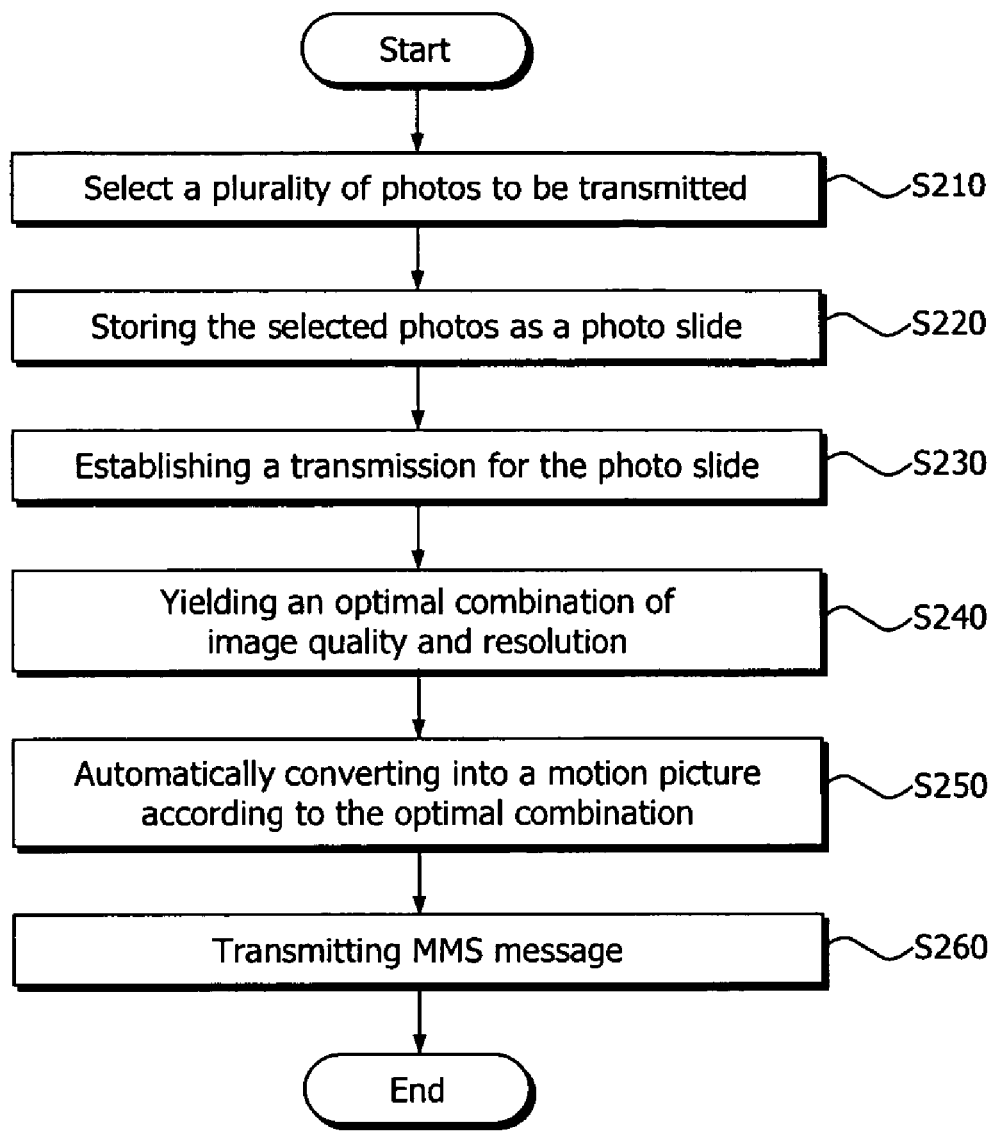
FIG. 2 is a flow chart illustrating a procedure of embodying a method for converting a photo slide-show into a motion picture in a mobile terminal in accordance with an embodiment of the present invention.

FIG. 2 is a flow chart illustrating a procedure of embodying an exemplary method for converting photo slides into a motion picture in a mobile terminal in accordance with an embodiment of the present invention.

Referring to the FIG. 2, a user may select a plurality of photos to be transmitted among photos which the user has taken or has downloaded over a wireless or wired interface by using a mobile terminal (S210). When the user sets the plurality of selected photos to be stored as a photo slide-show, the mobile terminal combines the plurality of photos in one photo slide-show and stores such in a memory or database (S220). The user can add other photos to the photo slide-show stored in the memory or database, or may delete any photo included in the slide-show upon selection from a photo slide-show list or menu.

When the user sets a transmission option for the photo slide-show (S230), the mobile terminal computes an optimal combination of the image quality and resolution size (S240) and converts the photo slide-show into a motion picture according to the computed optimal combination (S250). The image quality may be classified into high-end image quality, high image quality and normal image quality, and the resolution may be classified into 640*480 pixels, 320*240 pixels, 176*144 pixels, 128*96 pixels, or the like. As the image resolution of the mobile terminal is getting improved, the maximum pixels may be increased to higher numbers than 640*480 pixels.

The optimal combination refers to designating a combination of the image quality and the resolution as a default value of the mobile terminal according to a maximum transmittable capacity of MMS and the number of photos included in the photo slide-show. For instance, when the maximum transmittable capacity of an MMS message is 400 Kbytes and each photo may be displayed (on a screen) for five seconds, if the number of photos included in the photo slide-show is 14, the optimal combination therefor is previously determined to allow the photos to suitably have a resolution of 320*240 pixels with high image quality.

The optimal combination may depend on the default value of the mobile terminal. Nevertheless, the optical combination can be changed according to conditions set by the user. That is, the user can determine whether the optimal combination is based on the default value, or whether the resolution or the image quality is to have higher priority when forming the optimal combination. For instance, if the user sets priority to the resolution, and if conditions are the same as in the aforementioned situation (namely, if the maximum transmittable capacity of the MMS is 400 Kbytes and the number of photos included in the photo slide-show is 14), the optimal combination changes the resolution of the photos to 640*480 pixels with normal image quality.

Furthermore, regarding the audio data of the motion picture, the default may be set such that no sound recording is performed (i.e., there is no sound established for the audio of the motion picture) in order to accommodate more photos in the video file having limited size. Namely, a single MMS message that may have a capacity of 400 Kbytes, may thus contain up to 14 photos (of high quality: 320*240 pixels) when no audio data is included. If audio recordings are added, the total number of photos that could be attached to the MMS message would be decreased.

Alternatively, the user may set his own voice, effect sounds, background music, or the like as the audio recording of the motion picture. However, because the total number of photos that can be transmitted would be decreased if audio data is added, the converting of photos in a photo slide-show into a motion picture (video) file according to the present invention has a default setting wherein no sounds are recorded.

The motion picture conversion of the photo slide comprises a still image coding of designated displayed screen frame and continuous storing of the image as compressed image files. When a preview is complete, a message (notice, announcement), such as "processing motion picture files", is displayed and the stored image is compressed into the motion picture data to be stored as the motion picture file. Concurrently, the pre-stored images, as described earlier, may be deleted. Additionally, the motion picture file may be stored or updated in a motion picture album of a User Interface (UI) or a file storage folder.

When conversion into the motion picture and its storage are complete, the mobile terminal transmits the stored motion picture to a destination (e.g., a recipient phone number, an e-mail address, Internet URL, etc.) which the user inputs or selects (S260).

The conversion of the photo slide-show into the motion picture is performed by capturing the photo slide-show using appropriate hardware or circuitry (such as a motion picture capture board), to achieve a visual effect as if the photos in photo slide-show being displayed on the screen are recorded by a camcorder (video recording device), which will be explained with reference to FIG. 3.

Figure 3:
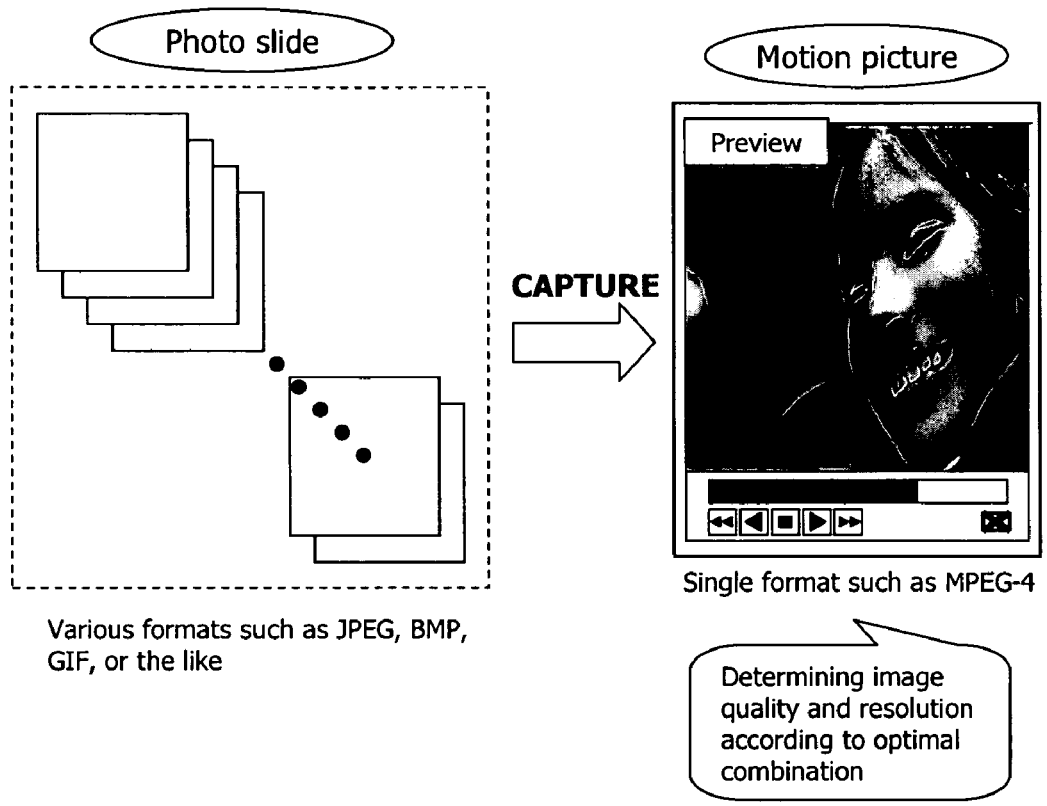
FIG. 3 is a schematic diagram illustrating an exemplary method for converting the photo slide-show into the motion picture according to the present invention.

FIG. 3 is a schematic diagram illustrating an exemplary method for converting a photo slide-show into a motion picture according to the present invention.

Referring to FIG. 3, a photo slide-show including many photos is converted into (or generated as) one motion picture file by an image capture procedure. During this procedure, an image quality and/or a resolution of the motion picture is set as an optimal combination according to a default value, and preferably, no sound recordings are performed (in order to maximize the number of photos that can be attached to the MMS message).

As explained previously, the default settings can be changed by the user. A photo format composing the photo slide-show may be in JPEG or BMP format, which may be different according to mobile terminal models. However, the format of the motion picture (video) used in mobile terminals is typically in a single format, such as MPEG-4, which is commonly and widely used in many countries.

It may take at least several seconds and to up several minutes to convert the photo slide-show into the motion picture (video) file according to the optimal combination of image quality and resolution. During this conversion time (i.e., waiting time or stand-by time), the mobile terminal can display a message such as 'Converting into motion picture is being carried out. Please wait', and/or may show the user the motion picture (or one or more still images) to provide a preview. Explicitly, during the preview is played, sequentially displayed images are captured and stored as the motion picture files by compressing data.

Many other types of outputs may be provided during this image conversion period. For example, various types of contents such as entertainment, games, information, advertisements, promotions, and the like may be provided to the user.

As explained thus far, in the method for converting a photo slide-show into a motion picture in the mobile terminal according to the present invention, it is possible to transmit at one time, a plurality of photos that exceed the maximum number of attachments for a single MMS message. The plurality of photos are converted into a motion picture (video) file having an appropriate image quality and resolution, upon considering the maximum transmission capacity, and the user need not repeatedly perform multiple transmission procedures for sending a plurality of photos.

Furthermore, in the method for converting the photo slide-show into the motion picture in the mobile terminal according to the present invention, photos having different formats according to different mobile terminal models are converted into a motion picture of a single format, to thereby be transmitted. As a result, the present invention advantageously relieves the processing burden of the mobile terminal that would otherwise need to convert the format of photos via processing with a network server. Also, the costs and resources required thereby can be minimized.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

To implement the various features described earlier, the present invention can employ the various type of the processor cooperating with the input unit and the output unit, to comprise a slide show module to combine a plurality of images and/or photos to allow playback as a slide show, an image quality and resolution module to assign an appropriate image quality and/or resolution to each image and/or photo of the slide show, and a video conversion module to convert a format of the images and/or photos of the slide show into a video file format for attachment to the message.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for forming a motion picture in a mobile terminal, comprising:
   identifying a plurality of photos from a photo list responsive to user input received at the mobile terminal, wherein the photo list comprises photos previously stored in memory associated with the mobile terminal;
   forming, at the mobile terminal, the motion picture comprising the identified plurality of photos,
   wherein the forming the motion picture includes,
   forming a photo slide-show that comprises the identified plurality of photos having different formats;
   determining an image quality and a resolution used for the forming of the motion picture according to transmission capacity of a wireless messaging service and the number of the identified plurality of photos when a transmission request for the photo slide-show is inputted; and
   converting the photo slide-show into the motion picture according to the determined image quality and the resolution,
   wherein the determined image quality and the resolution are changed when a priority between the image quality and a resolution is set, and an audio of the motion picture is established by carrying out a non-sound recording.

2. The method of claim 1, further comprising:
   adding audio to the motion picture responsive to user input at the mobile terminal, the audio permitting audio reproduction during playback of the motion picture.

3. The method of claim 1, further comprising:
   transmitting, after the forming, the motion picture from the mobile terminal using a multimedia message service (MMS).

4. The method of claim 1, further comprising:
   modifying the resolution of the motion picture to be one of a defined group of resolutions.

5. The method of claim 1, further comprising:
   displaying the motion picture on a display of the mobile terminal as a preview prior to transmitting the motion picture.

6. The method of claim 1, wherein the transmission capacity is a default value.

7. The method of claim 1, further comprising:
   displaying a preview on a display of the mobile terminal during a period of time at which the forming of the motion picture occurs, the preview being a sequential display of some or all of the identified plurality of photos.

8. The method of claim 1, further comprising:
   displaying a message on a display of the mobile terminal during a period of time at which the forming of the motion picture occurs, the message indicating that the motion picture is being formed.

9. The method of claim 1, further comprising:
   displaying the plurality of photos as the photo list on a display of the mobile terminal.

10. The method of claim 1, wherein the messaging service is a multimedia message service (MMS).

11. The method of claim 1, wherein the motion picture is a single file, and each of the identified plurality of photos is a separate file.

12. The method of claim 1, wherein the motion picture is of a first file format, and each of the identified plurality of photos is of a second file format, wherein the first file format and the second file format are different.

13. A mobile terminal, comprising:
    a transceiver configured to wirelessly communicate with a wireless network which supports a wireless messaging service;
    a memory;
    a display configured to display images;
    an input element;
    a processor configured to:
       identify a plurality of photos from a photo list responsive to user input received at the input element, wherein the photo list comprises photos previously stored in the memory;
       form a photo slide-show that comprises the identified plurality of photos;
       determine an image quality and a resolution used for the forming of the motion picture according to transmission capacity of a wireless messaging service and the number of the identified plurality of photos;
       convert the photo slide-show into the motion picture according to the determined image quality and the resolution, and
    a transceiver configured to perform the transmitting of the motion picture,
       wherein the determined image quality and the resolution are changed when a priority between the image quality and a resolution is set, and an audio of the motion picture is established by carrying out a non-sound recording.

14. The mobile terminal of claim 13, wherein the processor is further configured to:
    add audio to the motion picture responsive to user input at the input element, the audio permitting audio reproduction during playback of the motion picture.

15. The mobile terminal of claim 13, wherein the processor is further configured to:

determine the resolution of the motion picture to be one of a defined group of resolutions.

16. The mobile terminal of claim 13, wherein the display is further configured to:
   display the motion picture as a preview prior to transmitting the motion picture.

17. The mobile terminal of claim 13, wherein the transmission capacity is a default value.

18. The mobile terminal of claim 13, wherein the display is further configured to:
   display a preview during a period of time at which the forming of the motion picture occurs, the preview being a sequential display of some or all of the identified plurality of photos.

19. The mobile terminal of claim 13, wherein the display is further configured to:
   display a message during a period of time at which the forming of the motion picture occurs, the message indicating that the motion picture is being formed.

20. The mobile terminal of claim 13, wherein the display is further configured to:
   display the plurality of photos as the photo list.

21. The mobile terminal of claim 13, wherein the messaging service is a multimedia message service (MMS).

22. The mobile terminal of claim 13, wherein the motion picture is a single file, and each of the identified plurality of photos is a separate file.

23. The mobile terminal of claim 13, wherein the motion picture is of a first file format, and each of the identified plurality of photos is of a second file format, wherein the first file format and the second file format are different.

* * * * *